United States Patent
Hu et al.

(10) Patent No.: US 11,476,526 B2
(45) Date of Patent: Oct. 18, 2022

(54) SECONDARY BATTERY, BATTERY MODULE AND VEHICLE

(71) Applicant: CONTEMPORARY AMPEREX TECHNOLOGY CO., LIMITED, Ningde (CN)

(72) Inventors: Fei Hu, Ningde (CN); Dongyang Shi, Ningde (CN); Haizu Jin, Ningde (CN); Zhenhua Li, Ningde (CN); Ning Chen, Ningde (CN); Yuanbao Chen, Ningde (CN); Rui Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 50 days.

(21) Appl. No.: 16/890,457

(22) Filed: Jun. 2, 2020

(65) Prior Publication Data

US 2020/0295317 A1  Sep. 17, 2020

Related U.S. Application Data (63) Continuation of application No. PCT/CN2019/075826, filed on Feb. 22, 2019.

(30) Foreign Application Priority Data

Dec. 29, 2018  (CN) .......................... 201822269878.1

(51) Int. Cl.
*H01M 50/147* (2021.01)
*H01M 10/04* (2006.01)
(Continued)

(52) U.S. Cl.
CPC ..... *H01M 50/147* (2021.01); *H01M 10/0431* (2013.01); *H01M 50/531* (2021.01); *H01M 50/543* (2021.01); *H01M 2220/20* (2013.01)

(58) Field of Classification Search
CPC ........... H01M 50/147; H01M 10/0431; H01M 2220/20; H01M 50/531; H01M 50/543
See application file for complete search history.

(56) References Cited

U.S. PATENT DOCUMENTS 9,496,588 B2 * 11/2016 Nguyen ................. B60L 58/26
2006/0035152 A1    2/2006 Nishimura et al.
(Continued)

FOREIGN PATENT DOCUMENTS

CN      105609882 A  *  5/2016
CN      105609882 A     5/2016
(Continued)

OTHER PUBLICATIONS

The Online Materials Information Resource. MatWeb. (2021). Retrieved Nov. 10, 2021, from http://www.matweb.com/search/DataSheet.aspx?MatGUID=08fb0f47ef7e454fbf7092517b2264b2&ckck=1. (Year: 2021).*

(Continued)

*Primary Examiner* — Matthew T Martin
*Assistant Examiner* — Adam J Francis
(74) *Attorney, Agent, or Firm* — Morgan, Lewis & Bockius LLP (57) ABSTRACT

The present disclosure provides a secondary battery, a battery module and a vehicle. The secondary battery includes an electrode assembly, a case and a cap assembly. The case has an accommodating cavity, and the electrode assembly is accommodated in the accommodating cavity. The electrode assembly includes electrode units, and the electrode units are stacked in an axial direction of the accommodating cavity. The cap assembly includes a cap plate and an insulating member provided at an inner side of the cap plate, the cap plate is connected with the case, and the insulating member is positioned at a side of the electrode (Continued)

assembly in the axial direction. The insulating member is provided with a first surface at a side close to the electrode assembly, and the first surface is a flat surface.

18 Claims, 4 Drawing Sheets

(51) Int. Cl.
   *H01M 50/531* (2021.01)
   *H01M 50/543* (2021.01)

(56) References Cited

U.S. PATENT DOCUMENTS

| | | | |
|---|---|---|---|
| 2008/0206628 A1* | 8/2008 | Honbou | H01M 10/0525 |
| | | | 429/94 |
| 2012/0121967 A1 | 5/2012 | Nakamura et al. | |
| 2015/0221925 A1 | 8/2015 | Kim et al. | |
| 2018/0097208 A1* | 4/2018 | Maeda | H01M 50/172 |
| 2019/0237741 A1* | 8/2019 | Lee | H01M 50/581 |

FOREIGN PATENT DOCUMENTS

| | | | |
|---|---|---|---|
| CN | 108461665 A | * | 8/2018 |
| CN | 207800658 U | | 8/2018 |
| CN | 207896132 U | | 9/2018 |
| KR | 20080112653 A | | 12/2008 |
| KR | 20170050875 A | | 5/2017 |
| WO | WO2017204137 A1 | | 11/2017 |
| WO | WO2017208534 A1 | | 12/2017 |

OTHER PUBLICATIONS

English Translation of CN 108461665A, Secondary Battery top cover and secondary battery thereof, Aug. 28, 2018, DongGuan Baisili New energy Tech Co Ltd. (Year: 2018).*
English translation of CN105609882A, Energy Storage device with internal multi-core stack; May 25, 2016 (Year: 2016).*
Contemporary Amperex Technology Co. Limited, International Search Report and Written Opinion, PCT/CN2019/075826, dated Oct. 10, 2019, 12 pgs.
Contemporary Amperex Technology Co. Limited, Extended European Search Report, EP19903839.9, dated Dec. 13, 2021, 4 pgs.

* cited by examiner

SECONDARY BATTERY, BATTERY MODULE AND VEHICLE

CROSS REFERENCE TO RELATED APPLICATIONS

This application is a continuation application of PCT/CN2019/075826, filed on Feb. 22, 2019, which claims priority to Chinese Patent Application No. 201822269878.1, filed with the National Intellectual Property Administration of the People's Republic of China on Dec. 29, 2018, all of which are incorporated herein by reference in their entirety.

TECHNICAL FIELD

The present disclosure relates to the field of battery, and particularly relates to a secondary battery, a battery module and a vehicle.

BACKGROUND

A battery module generally includes secondary batteries arranged sequentially, and each secondary battery is provided with an electrode assembly inside. In the charge process or discharge process, the electrode assembly will expand in an arrange direction of the secondary batteries; expanding forces generated by the electrode assemblies of the secondary batteries will be accumulated in the arrange direction and form an excessive composite force; the composite force presses the secondary batteries, which leads to the secondary battery being unable to work normally and influences the life of the secondary battery.

SUMMARY

A secondary battery in accordance with some embodiments comprises an electrode assembly, a case and a cap assembly. The case has an accommodating cavity, the accommodating cavity has an opening, and the electrode assembly is accommodated in the accommodating cavity. The electrode assembly comprises electrode units, and the electrode units are stacked in an axial direction of the accommodating cavity. The cap assembly comprises a cap plate and an insulating member provided at an inner side of the cap plate, the cap plate is connected with the case, and the insulating member is positioned at a side of the electrode assembly in the axial direction. The insulating member is provided with a first surface at a side close to the electrode assembly, and the first surface is a flat surface.

Reference numerals in figures are represented as follows:
1 electrode assembly
11 electrode unit
111 first electrode plate
112 second electrode plate
113 separator
2 case
21 accommodating cavity
3 cap assembly
31 cap plate
32 insulating member
321 first surface
322 first groove
323 second groove
33 electrode terminal
34 current collecting member
341 first portion
342 second surface
343 second portion
344 third portion
35 connecting member
S1 wide surface
S2 narrow surface
G1 first buffer gap
G2 second buffer gap
X length direction
Y width direction
Z axial direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second" and "third" are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure.

In the present disclosure, a battery module in accordance with some embodiments generally includes a secondary battery, an end plate, a side plate and a busbar. The secondary battery is provided as plurality in number and the plurality of secondary batteries are arranged sequentially. The secondary battery of the present disclosure is a prismatic lithium-ion battery in some embodiments. An arrange direction of the secondary batteries is parallel to a width direction Y of each secondary battery. The end plate is provide as two in number and the two end plates are respectively provided at two ends of the secondary batteries in the arrange direction, the side plate is provided as two in number and the two side plates are respectively provided at two sides of the secondary batteries. The end plates and the side plates are welded together to form a rectangular frame. The secondary batteries are fixed to the frame. The busbar connects the secondary batteries together in series, in parallel or in series-parallel.

Hereinafter a secondary battery of the present disclosure will be described in detail.

Figure 1:
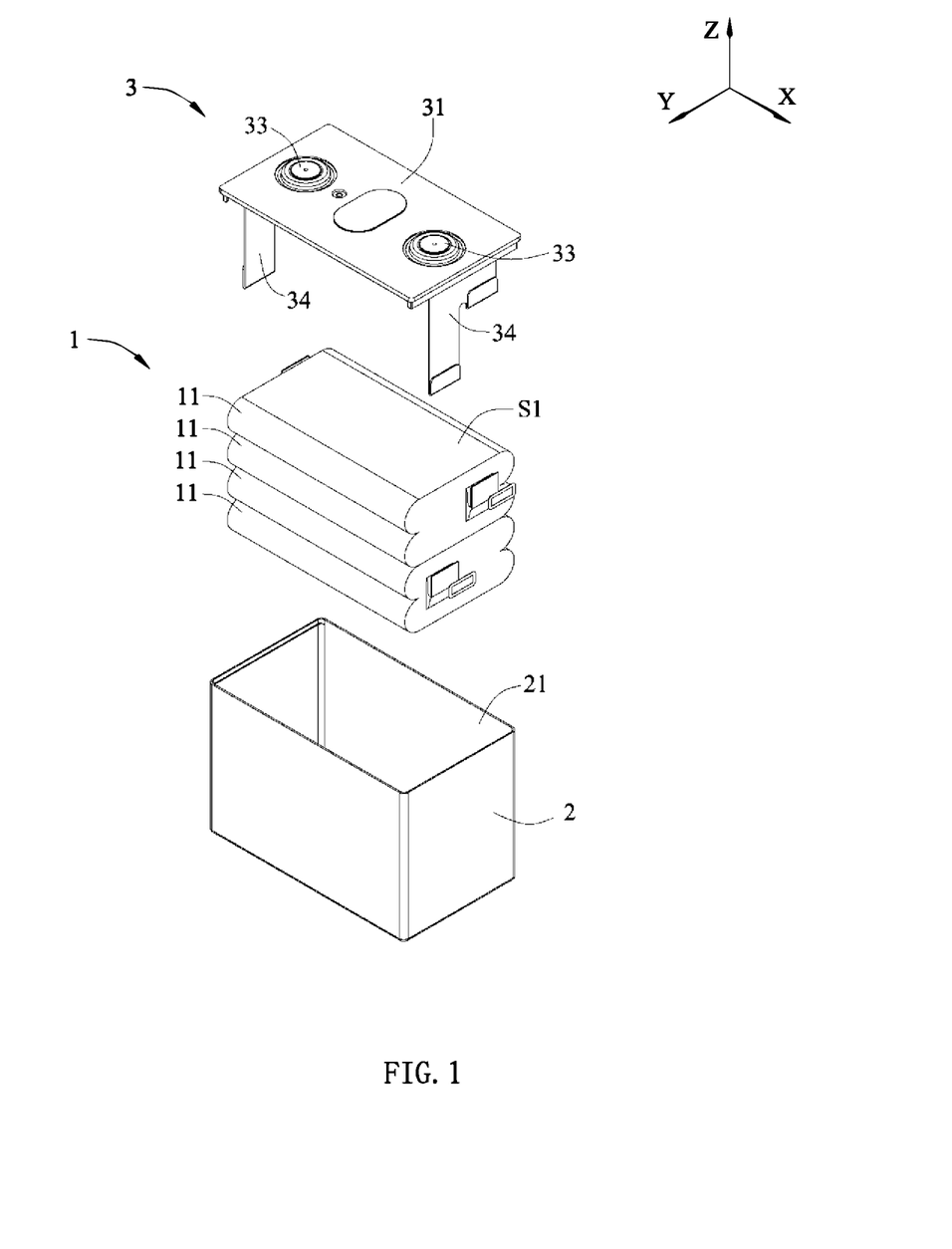
FIG. 1 is an exploded view of a secondary battery according to the present disclosure.
Figure 2:
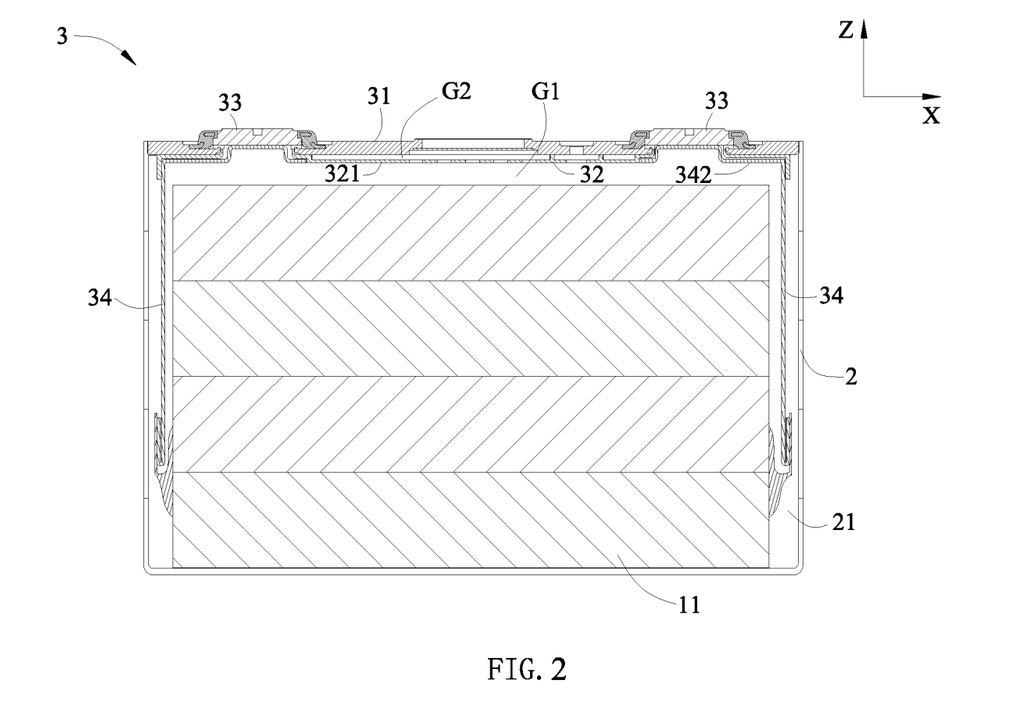
FIG. 2 is a cross sectional view of the secondary battery according to the present disclosure.

Referring to FIG. 1 and FIG. 2, the secondary battery in accordance with some embodiments includes an electrode assembly 1, a case 2 and a cap assembly 3.

An accommodating cavity 21 is formed in the case 2 to receive the electrode assembly 1 and an electrolyte. An opening is formed at an end of the case 2 in an axial direction Z, and the electrode assembly 1 is placed into the case 2 via the opening. The case 2 in accordance with some embodiments is made of conductive metal material, such as aluminum, aluminum alloy or the like. The axial direction Z is parallel to an extending direction of the accommodating cavity 21, and when the cap assembly 3 of the secondary battery used in a vehicle is substantially parallel to the ground, the axial direction Z is parallel to a height direction of the secondary battery, perpendicular to the width direction Y of the secondary battery, a length direction X of the secondary battery and the arrange direction of the secondary batteries.

Figure 3:
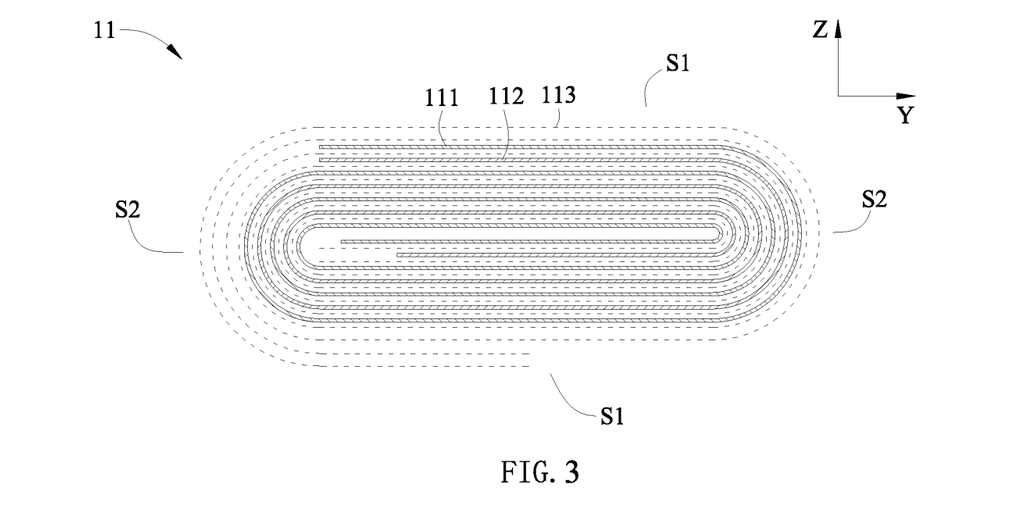
FIG. 3 is a cross sectional view of an electrode unit of FIG. 1.

The electrode assembly 1 in accordance with some embodiments includes electrode units 11, and the electrode units 11 are stacked in the axial direction Z of the accommodating cavity 21. Referring to FIG. 3, each electrode unit 11 includes a first electrode plate 111, a second electrode plate 112 and a separator 113, and the separator 113 separates the first electrode plate 111 and the second electrode plate 112. In some embodiments, the electrode unit 11 is formed by spirally winding the first electrode plate 111, the second electrode plate 112 and the separator 113, and the electrode unit 11 may be pressed to a flat structure. Alternatively, in other embodiments, each electrode unit 11 is formed by stacking the first electrode plate 111, the second electrode plate 112 and the separator 113.

The first electrode plate 111 includes an aluminum foil and a positive active material coated on a surface of the aluminum foil, the positive active material includes lithium manganese oxide or lithium iron phosphate. The second electrode plate 112 includes a copper foil and a negative active material coated on a surface of the copper foil, the negative active material includes graphite or silicon.

The cap assembly 3 includes a cap plate 31, an insulating member 32, an electrode terminal 33 and a current collecting member 34. The cap plate 31 is connected with the case 2 and covers the opening of the case 2, thereby sealing the electrode assembly 1 inside the accommodating cavity 21 of the case 2. The insulating member 32 is provided at an inner side of the cap plate 31, that is, the insulating member 32 is provided at a side of the cap plate 31 close to the electrode assembly 1. The electrode terminal 33 is provided to the cap plate 31 and protrudes to outside of the cap plate 31. Both of the electrode terminal 33 and the current collecting member 34 are provided as two in number, one the current collecting member 34 connects the first electrode plate 111 and one electrode terminal 33, the other current collecting member 34 connects the second electrode plate 112 and the other electrode terminal 33.

The insulating member 32 is positioned at a side of the electrode assembly 1 in the axial direction Z, that is, the insulating member 32 is positioned at an end of the electrode units 11 in a stack direction of the electrode unit 11. The insulating member 32 is provided with a first surface 321 at a side close to the electrode assembly 1, and the first surface 321 is a flat surface. In some embodiments, the first surface 321 is substantially perpendicular to the axial direction Z.

In the charge process or discharge process, each electrode unit 11 will expand. In the present disclosure, the electrode units 11 of the secondary battery are stacked in the axial direction Z, so expansions of the electrode units 11 will be accumulated in the axial direction Z. In the width direction Y, the expansions of the electrode units 11 is smaller, so the overall expansion amount of the electrode assembly 1 in the width direction Y is smaller, correspondingly, an expanding force applied to the case 2 by the electrode assembly 1 is smaller too.

In the battery module, the arrange direction of the secondary batteries is perpendicular to the axial direction Z, so even though the expansion amounts of all the electrode assemblies 1 are accumulated in the arrange direction, it still will not generate an excessive composite force, thereby avoiding the secondary battery being crushed, and ensuring the performance and life of the secondary battery.

In addition, in known technology, two end plates of the battery module need to clamp the secondary batteries; if the composite force generated by the expansions of the secondary batteries is excessive, it may lead to a welding position between the end plate and the side plate fracturing and result in failure of the battery module. In the present disclosure, the composite force generated by the secondary batteries when expanding is small, thereby avoiding the failure of the battery module.

In the secondary battery, when the electrode units 11 expand, the expansions of the electrode units 11 will be accumulated in the axial direction Z, thereby leading to the electrode unit 11 of the electrode assembly 1 closest to the insulating member 32 contacting the first surface 321 of the insulating member 32, and even pressing the first surface 321. If the first surface 321 is uneven, a force applied to the electrode unit 11 by the first surface 321 is uneven too, thereby leading to local deformation of the electrode unit 11 being serious, resulting in the electrode plate of the electrode unit 11 fracturing, and causing safety risk. In the present disclosure, the first surface 321 is a flat surface, so when the electrode units 11 expand, it can avoid the electrode unit 11 deforming uneven, prevent the electrode plate from fracturing and improve safety performance.

Referring to FIG. 3, the electrode unit 11 is a flat structure formed by winding, a periphery of the electrode unit 11 forms a wide surface S1 and a narrow surface S2. The wide surface S1 is provided as two in number and the two wide surfaces S1 are respectively positioned at two ends of the electrode unit 11 in the axial direction Z, the narrow surface S2 is provided as two in number and the two narrow surfaces S2 are respectively positioned at two ends of the electrode unit 11 in the width direction Y. Each narrow surface S2 is in the shape of arc and connects the two wide surfaces S1.

The wide surface S1 of electrode unit 11 at uppermost is disposed to face the first surface 321 in the axial direction Z. Before the electrode unit 11 expands, the wide surface S1 is approximately parallel to the first surface 321. The wide surface S1 has a larger area, when the electrode unit 11 expands, the wide surface S1 and the first surface 321 facing each other are easier to contact evenly.

In the secondary battery, the electrode units 11 are directly stacked in the axial direction Z. Two adjacent electrode units 11 contact each other via the wide surfaces S1 thereof.

A dimension of the first surface 321 in the width direction Y is larger than a dimension of the wide surface S1 in the width direction Y. In this way, the first surface 321 can completely cover the wide surface S1 in the width direction Y, which ensures that the wide surface S1 deforms evenly. Preferably, in the width direction Y, a midline of the first surface 321 is aligned with a midline of the wide surface S1 up and down.

The insulating member 32 is made from insulating material, such as plastic.

When the electrode assembly 1 presses the insulating member 32, the insulating member 32 made from plastic can absorb expanding force via deformation, thereby decreasing a reaction force applied to the electrode assembly 1 and avoiding the electrode plate being fractured.

If a Young's modulus of the insulating member 32 is too high, the deformation ability of the insulating member 32 is poor, and the insulating member 32 cannot absorb the expanding force effectively. Therefore, preferably, the Young's modulus of the insulating member 32 is 0.5 Gpa-1.2 Gpa.

A first buffer gap G1 is provided between the insulating member 32 and the electrode assembly 1. When the electrode assembly 1 expands, the first buffer gap G1 can reserve a certain expanding space for the electrode assembly 1; in other words, the first buffer gap G1 can absorb expansion of the electrode assembly 1, decrease the expanding force applied to the insulating member 32 by the electrode assembly 1 and function as buffering.

Preferably, in the axial direction Z, a height of the first buffer gap G1 is 0.5 mm-12 mm. If the height of the first buffer gap G1 in the axial direction Z is too small, for example less than 0.5 mm, buffering effect of the first buffer gap G1 is limited, and the insulating member 32 is still subjected to a larger expanding force. If the height of the first buffer gap G1 in the axial direction Z is too large, for example larger than 12 mm, it will lead to excessive waste of space and reduce energy density of the secondary battery.

A second buffer gap G2 is provided between the cap plate 31 and the insulating member 32. When the electrode assembly 1 presses the insulating member 32, the insulating member 32 can release the expanding force via deformation. By providing the second buffer gap G2, it can avoid the cap plate 31 limiting the deformation of the insulating member 32, thereby functioning as buffering. Further, by providing the second buffer gap G2, it can decrease the expanding force transferred to the cap plate 31, thereby avoiding deformation of the cap plate 31.

Figure 6:
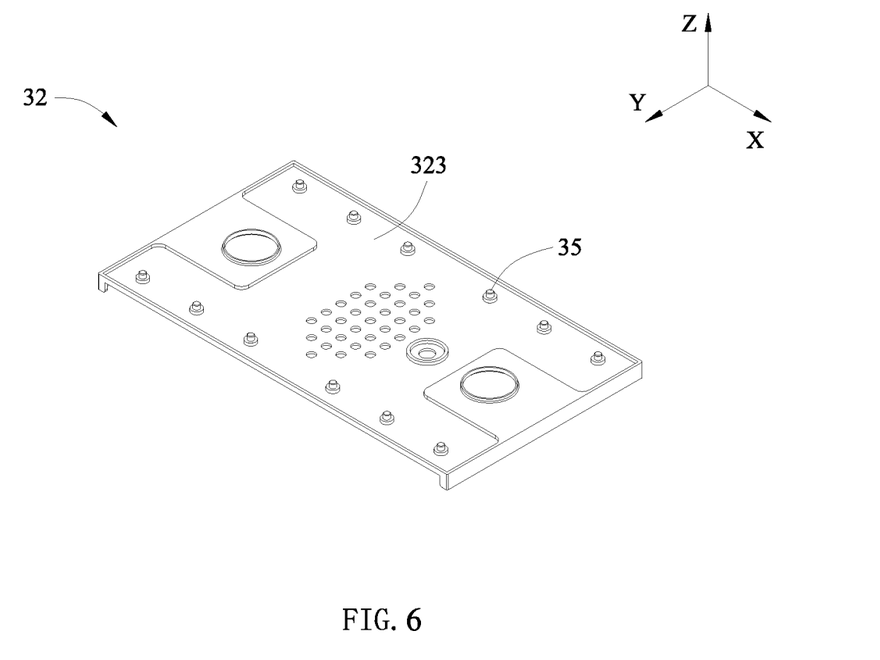
FIG. 6 is another schematic view of the insulating member of FIG. 4.

Referring to FIG. 6, in the present disclosure, the second buffer gap G2 is formed by providing a second groove 323 in the insulating member 32.

The cap plate 31 is fixedly connected with the insulating member 32 via a connecting member 35. In some embodiments, the connecting member 35 and the insulating member 32 is formed integrally. The connecting member 35 is fixed to the cap plate 31 by thermal melting. Referring to FIG. 6, a part of the connecting member 35 is received in the second groove 323.

If a flatness of the first surface 321 is too large, when the first surface 321 contacts the electrode unit 11, it will lead to the electrode unit 11 deforming unevenly, resulting in the electrode plate fracturing. Therefore, the flatness of the first surface 321 is not larger than 0.6 mm, preferably not larger than 0.3 mm.

Figure 4:
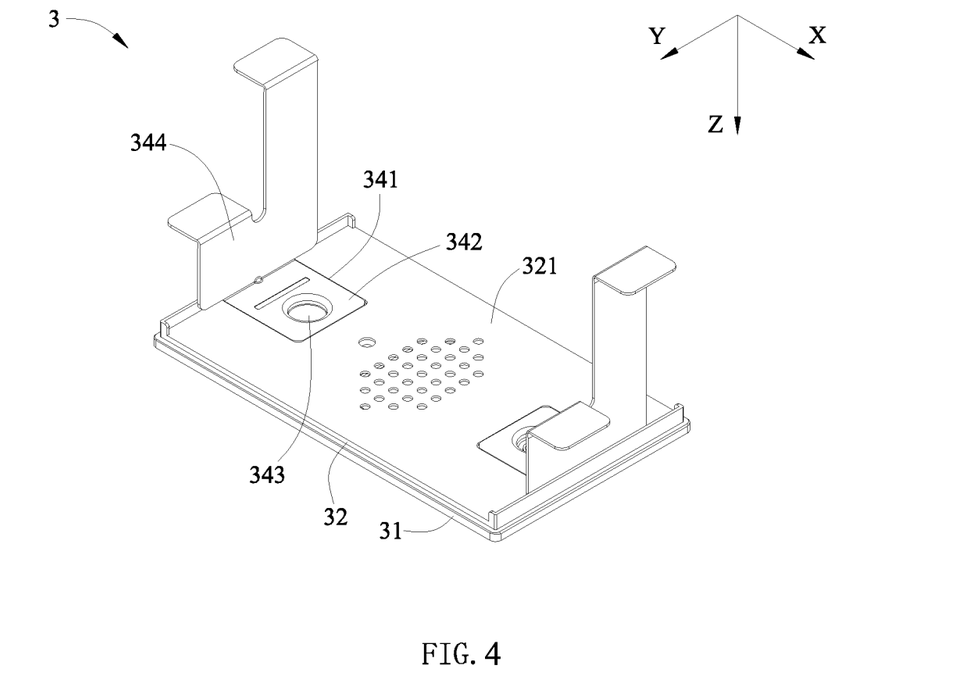
FIG. 4 is a schematic view of a cap assembly of FIG. 1.
Figure 5:
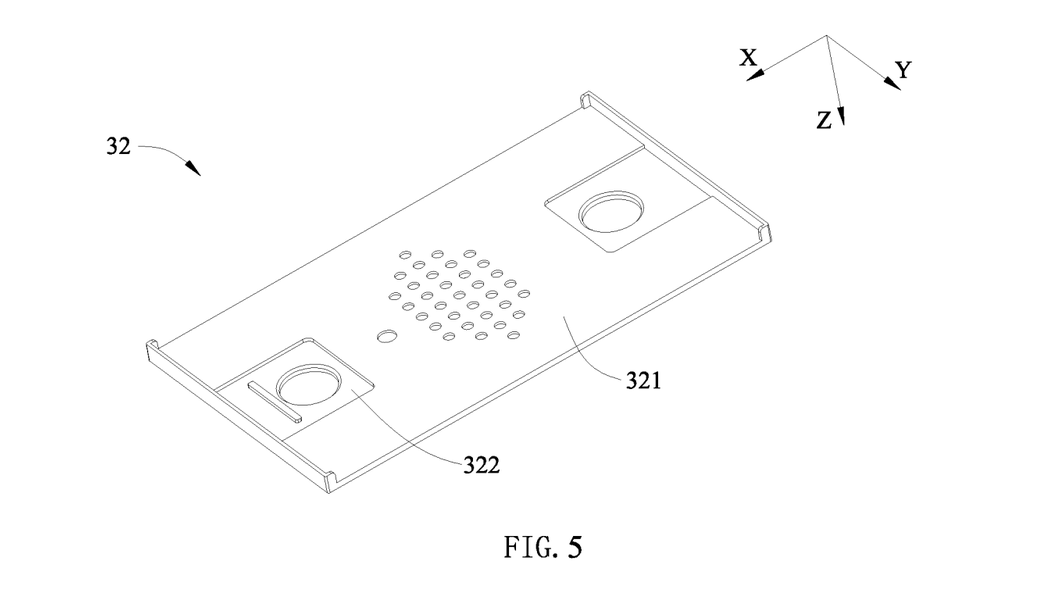
FIG. 5 is a schematic view of an insulating member of FIG. 4.

Referring to FIG. 4 and FIG. 5, the insulating member 32 is provided with a first groove 322 at a side close to the electrode assembly 1, a through-hole is provided on a bottom wall of the first groove 322. The current collecting member 34 includes a first portion 341, a second portion 343 and a third portion 344. The first portion 341 is received in the first groove 322. The second portion 343 is connected with the first portion 341 and extends into the through-hole of the insulating member 32, and the second portion 343 is fixed with the electrode terminal 33. The third portion 344 bends downwardly from an end of the first portion 341 in the length direction X and is connected with the electrode assembly 1. In the present disclosure, by providing the first groove 322, it can decrease a space occupied by the current collecting member 34 in the axial direction Z.

The first portion 341 is provided with a second surface 342 at a side close to the electrode assembly 1. When the electrode assembly 1 expands, the electrode assembly 1 may press the second surface 342; if the first surface 321 is misaligned with and the second surface 342, the electrode assembly 1 deforms unevenly at a boundary between the first surface 321 and the second surface 342, which leads to the electrode plate fracturing. Therefore, in the present disclosure, the second surface 342 is flush with the first surface 321 preferably.

What is claimed is:

1. A secondary battery, comprising an electrode assembly, a case and a cap assembly;
   the case having an accommodating cavity and a bottom wall, the accommodating cavity having an opening, and the electrode assembly being accommodated in the accommodating cavity;
   the electrode assembly comprising electrode units, and the electrode units being stacked in an axial direction of the accommodating cavity;
   the cap assembly comprising a cap plate and an insulating member provided at an inner side of the cap plate, the cap plate being connected with the case and covering the opening of the case, the cap plate facing the bottom wall of the case in the axial direction, and the insulating member being positioned at a side of the electrode assembly in the axial direction;
   the insulating member being provided with a first surface at a side close to the electrode assembly, and the first surface being a flat surface;
   the electrode units each comprising a first electrode plate, a second electrode plate and a separator, the separator separating the first electrode plate and the second electrode plate;
   the electrode units each being a flat structure and having a wide surface and a narrow surface;
   the first surface of the insulating member being disposed to face the wide surface of the electrode units in the axial direction, two adjacent electrode units contacting each other via the wide surfaces thereof; in a region which is covered by the wide surface in the axial direction, the first electrode plate, the second electrode plate and the separator being stacked in the axial direction;
   the narrow surface of the electrode units being connected with the wide surface of the electrode units and positioned at an end of the electrode units in a width direction;
   the cap assembly further comprising an electrode terminal and a current collecting member, the electrode terminal being provided to the cap plate, and the current collecting member connecting the electrode terminal and the electrode assembly; and
   the insulating member being provided with a first groove at a side close to the electrode assembly and a through-hole on a bottom wall of the first groove, the current collecting member comprising a second portion, the second portion extending into the through-hole of the insulating member, and the second portion being fixed with the electrode terminal.

2. The secondary battery according to claim 1, wherein the narrow surface is in the shape of arc.

3. The secondary battery according to claim 1, wherein a dimension of the first surface in the width direction is larger than a dimension of the wide surface in the width direction.

4. The secondary battery according to claim 1, wherein the insulating member is made from plastic, and a Young's modulus of the insulating member is 0.5 Gpa-1.2 Gpa.

5. The secondary battery according to claim 1, wherein a first buffer gap is provided between the insulating member and the electrode assembly.

6. The secondary battery according to claim 5, wherein in the axial direction, a height of the first buffer gap is 0.5 mm-12 mm.

7. The secondary battery according to claim 1, wherein a flatness of the first surface is not larger than 0.6 mm.

8. The secondary battery according to claim 1, wherein
the current collecting member further comprises a first portion received in the first groove
the first portion is provided with a second surface at a side close to the electrode assembly, and the second surface is flush with the first surface.

9. The secondary battery according to claim 8, wherein
the current collecting member further comprises a third portion;
the second portion is connected with the first portion;
the third portion bends downwardly from an end of the first portion and is connected with the electrode assembly.

10. The secondary battery according to claim 1, wherein a second buffer gap is provided between the cap plate and the insulating member.

11. The secondary battery according to claim 10, wherein the second buffer gap is formed by providing a second groove in the insulating member.

12. The secondary battery according to claim 11, wherein the cap plate and the insulating member are fixedly connected via a connecting member, and a part of the connecting member is received in the second groove.

13. The secondary battery according to claim 12, wherein
the connecting member and the insulating member are formed integrally, and the connecting member is fixed with the cap plate by thermal melting.

14. A battery module, comprising secondary batteries arranged sequentially;
the secondary battery comprising an electrode assembly, a case and a cap assembly;
the case having an accommodating cavity and a bottom wall, the accommodating cavity having an opening, and the electrode assembly being accommodated in the accommodating cavity;
the electrode assembly comprising electrode units, and the electrode units being stacked in an axial direction of the accommodating cavity;
the cap assembly comprising a cap plate and an insulating member provided at an inner side of the cap plate, the cap plate being connected with the case and covering the opening of the case, the cap plate facing the bottom wall of the case in the axial direction, the cap plate facing the bottom wall of the case in the axial direction, and the insulating member being positioned at a side of the electrode assembly in the axial direction;
the insulating member being provided with a first surface at a side close to the electrode assembly, and the first surface being a flat surface;
the electrode units each comprising a first electrode plate, a second electrode plate and a separator, the separator separating the first electrode plate and the second electrode plate;
the electrode units each being a flat structure and having a wide surface and a narrow surface;
the first surface of the insulating member being disposed to face the wide surface of the electrode units in the axial direction, two adjacent electrode units contacting each other via the wide surfaces thereof; in a region which is covered by the wide surface in the axial direction, the first electrode plate, the second electrode plate and the separator being stacked in the axial direction;
the narrow surface of the electrode units being connected with the wide surface of the electrode units and positioned at an end of the electrode units in a width direction;
the cap assembly further comprising an electrode terminal and a current collecting member, the electrode terminal being provided to the cap plate, and the current collecting member connecting the electrode terminal and the electrode assembly;
the insulating member being provided with a first groove at a side close to the electrode assembly and a through-hole on a bottom wall of the first groove, the current collecting member comprising a second portion, the second portion extending into the through-hole of the insulating member, and the second portion being fixed with the electrode terminal; and
an arrange direction of the secondary batteries being perpendicular to the axial direction.

15. The battery module according to claim 14, wherein a
a dimension of the first surface in the width direction is larger than a dimension of the wide surface in the width direction.

16. The battery module according to claim 14, wherein
a first buffer gap is provided between the insulating member and the electrode assembly.

17. The battery module according to claim 14, wherein
the battery module further comprises two end plates and two side plates, the two end plates are respectively provided at two ends of the secondary batteries in the arrange direction of the secondary batteries, the two side plates are respectively provided at two sides of the secondary batteries, the two end plates and the two side plates are welded together to form a rectangular frame.

18. A vehicle, comprising a battery module, the battery module comprising secondary batteries arranged sequentially;
the secondary battery comprising an electrode assembly, a case and a cap assembly;
the case having an accommodating cavity and a bottom wall, the accommodating cavity having an opening, and the electrode assembly being accommodated in the accommodating cavity;
the electrode assembly comprising electrode units, and the electrode units being stacked in an axial direction of the accommodating cavity;
the cap assembly comprising a cap plate and an insulating member provided at an inner side of the cap plate, the cap plate being connected with the case and covering the opening of the case, the cap plate facing the bottom wall of the case in the axial direction, and the insulating member being positioned at a side of the electrode assembly in the axial direction;

the insulating member being provided with a first surface at a side close to the electrode assembly, and the first surface being a flat surface;

the electrode units each comprising a first electrode plate, a second electrode plate and a separator, the separator separating the first electrode plate and the second electrode plate;

the electrode units each being a flat structure and having a wide surface and a narrow surface;

the first surface of the insulating member being disposed to face the wide surface of the electrode units in the axial direction, two adjacent electrode units contacting each other via the wide surfaces thereof; in a region which is covered by the wide surface in the axial direction, the first electrode plate, the second electrode plate and the separator being stacked in the axial direction;

the narrow surface of the electrode units being connected with the wide surface of the electrode units and positioned at an end of the electrode units in a width direction;

the cap assembly further comprising an electrode terminal and a current collecting member, the electrode terminal being provided to the cap plate, and the current collecting member connecting the electrode terminal and the electrode assembly;

the insulating member being provided with a first groove at a side close to the electrode assembly and a through-hole on a bottom wall of the first groove, the current collecting member comprising a second portion, the second portion extending into the through-hole of the insulating member, and the second portion being fixed with the electrode terminal; and an arrange direction of the secondary batteries being perpendicular to the axial direction.

* * * * *